United States Patent
Horsch

[19]
[11] Patent Number: 6,138,591
[45] Date of Patent: Oct. 31, 2000

[54] SEEDING DEVICE WITH A MODULAR DOSING DEVICE

[75] Inventor: Michael Horsch, Schwandorf, Germany

[73] Assignee: Horsch Maschinen GmbH, Germany

[21] Appl. No.: 08/973,550

[22] PCT Filed: Jun. 19, 1996

[86] PCT No.: PCT/DE96/01079

§ 371 Date: Dec. 19, 1997

§ 102(e) Date: Dec. 19, 1997

[87] PCT Pub. No.: WO97/00603

PCT Pub. Date: Jan. 9, 1997

[30] Foreign Application Priority Data

Jun. 20, 1995 [DE] Germany ............ 195 22 2296

[51] Int. Cl.[7] ............................................. A01C 7/00
[52] U.S. Cl. .................... 111/178; 111/903; 222/368
[58] Field of Search ....................... 111/177, 178, 111/186, 77, 170, 903; 222/317, 312, 368

[56] References Cited

U.S. PATENT DOCUMENTS

| | | |
|---|---|---|
| 3,606,965 | 9/1971 | Cortelyou et al. . |
| 4,705,220 | 11/1987 | Gandrud et al. .................. 111/77 X |
| 5,003,894 | 4/1991 | Lafferty ............................ 111/178 |
| 5,024,173 | 6/1991 | Deckler ............................. 111/178 |
| 5,189,965 | 3/1993 | Hobbs et al. . |
| 5,684,476 | 11/1997 | Anderson ......................... 111/130 X |
| 5,772,081 | 6/1998 | Wei et al. ......................... 222/368 |
| 5,855,303 | 1/1999 | Gregor ............................. 222/368 |

FOREIGN PATENT DOCUMENTS

| | | |
|---|---|---|
| 0 218 813 | 4/1987 | European Pat. Off. . |
| 0 259 633 | 3/1988 | European Pat. Off. . |
| WO 92/12619 | 8/1992 | WIPO . |

*Primary Examiner*—Victor Batson
*Attorney, Agent, or Firm*—Hoffman, Wasson & Gitler

[57] ABSTRACT

A sowing device for discharging metered quantities of seed, fertilizer or the like grains is characterized in that the metering device is provided with one or more exchangeable cellular wheels (17), that the housing (16) of the metering device, which accommodates the cellular wheel (17) is designed axially symmetrical at both opposing faces in relation to the driving unit, the bearing and the assembly of the metering device and the fastening thereof, and has a removable shaft (18), that the housing (16) is designed without bearing, and at least one driving unit (22) with bearing and/or at least one bearing unit (24) is coupled thereto, that the shaft (18) in the form of a plug-on or slip-on shaft is supported in the driving and/or bearing unit(s), and that the driving and/or the bearing unit can be plugged, screwed or similarly attached to the housing (16).

5 Claims, 5 Drawing Sheets

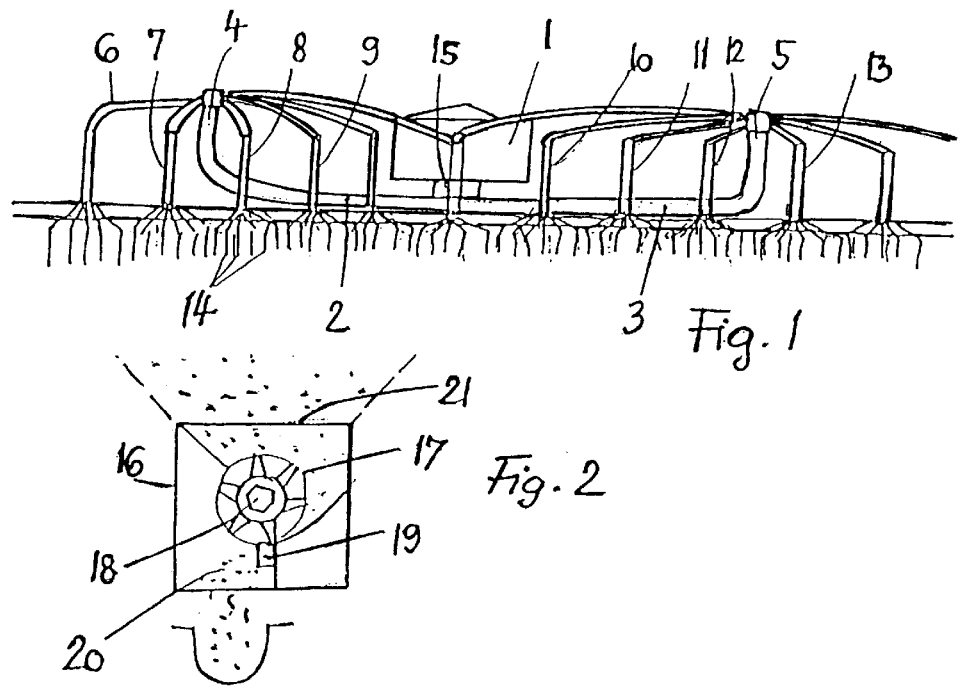
Fig. 1
Fig. 2
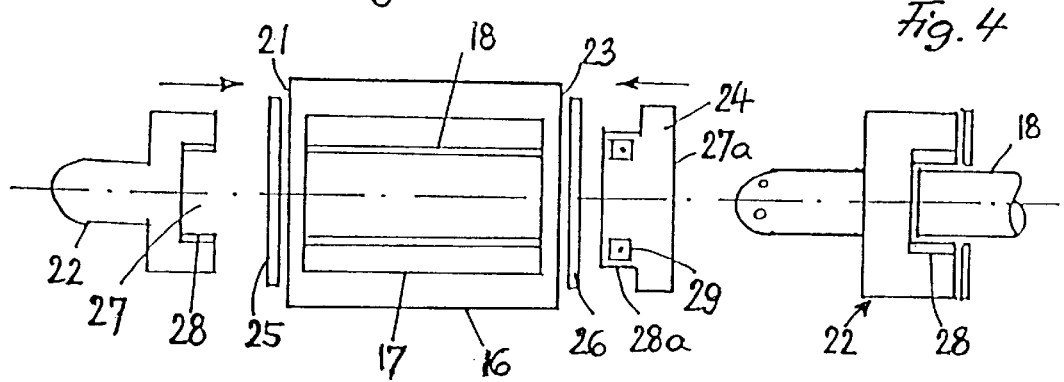
Fig. 3
Fig. 4
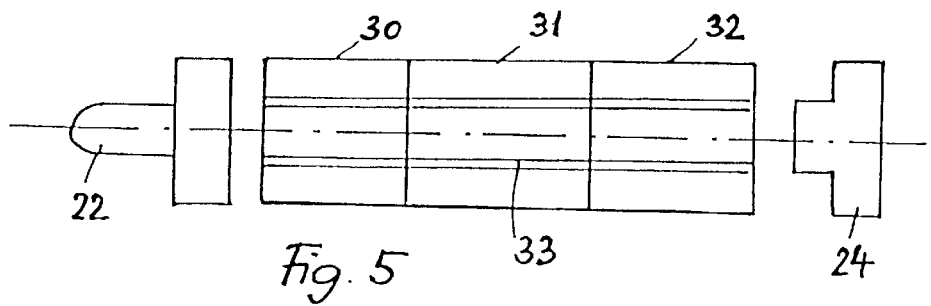
Fig. 5

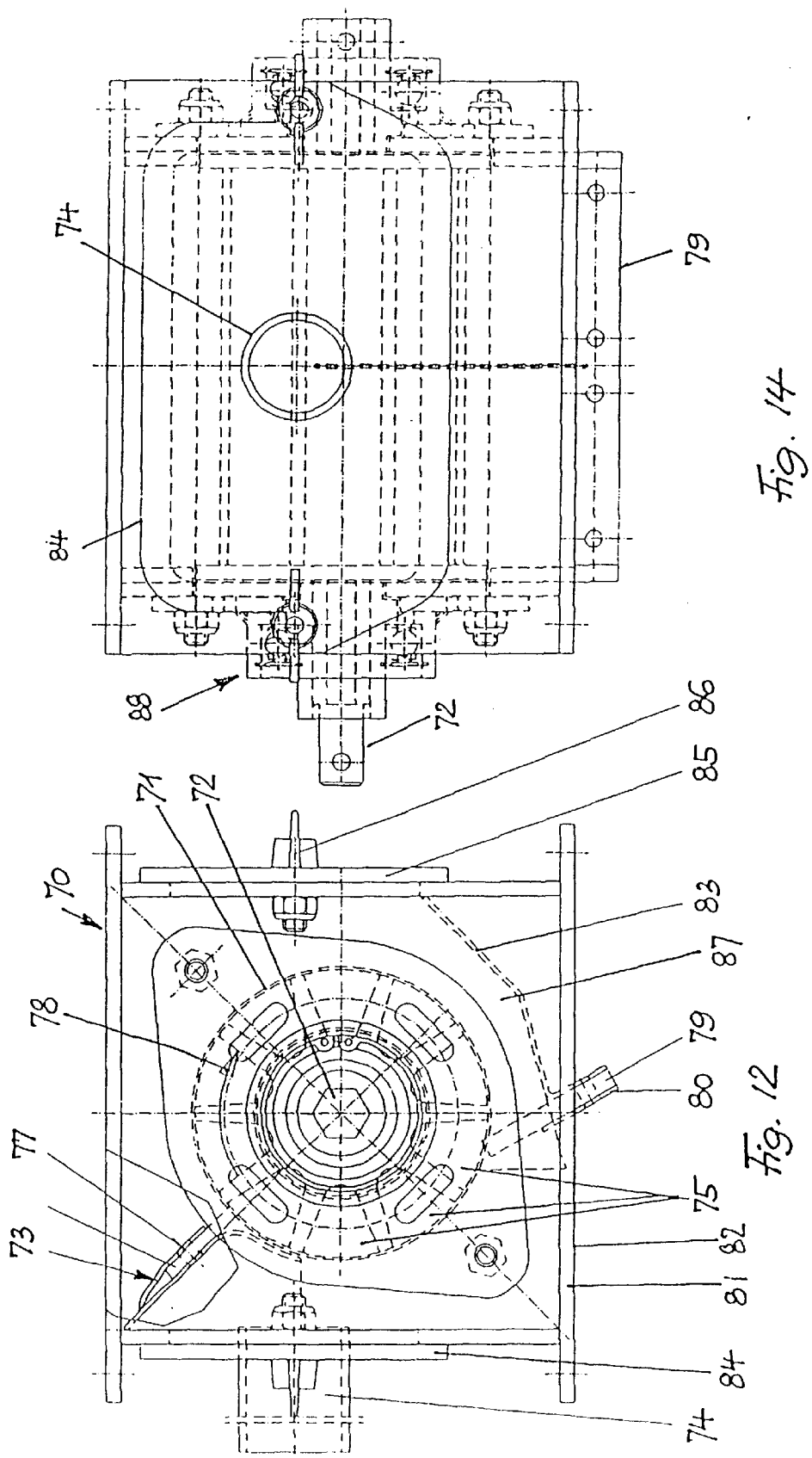

SEEDING DEVICE WITH A MODULAR DOSING DEVICE

BACKGROUND OF THE INVENTION

1. Field of the Invention

The present invention relates to sowing apparatus for the metered dispensing of seed material of varying size and type, fertilizers, chemical granulates and the like, by means of at least one metering device, comprising a cellular wheel arranged within a casing, and a pneumatic drive for transporting the granular material discharged from the cellular wheel through feeding ducts, hoses into distributor ducts or holes to the fertilizer or granulate outlets.

2. Prior Art

Metering apparatuses (made by Flexi-Coil) are known, with which cellular wheels for coarse, fine and superfine distribution of different types and grain sizes of seed material and fertilizers in granular form are available. Such metering apparatuses are exchanged if wheels for different grain sizes are required.

Furthermore, metering apparatuses (made by Accord) with central cellular wheels for seed grains are known, with which by means of the cellular wheel the seed is metered exactly according to its volume, and, for example, is sealed by means of a rubber ledge. The amount of seed can be continuously adjusted by changing the width of the cells. This allows an exact meeting operation dependent on the path and the volume.

For obtaining an exact sowing operation sowing machines with precise wheels are known, which are individually supported in one sowing casing each. Bottom flaps allow the adjustment in four positions for adapting to various sizes of seeds.

Furthermore, from EP-A 0 295 633, a metering apparatus for volumetrically discharging of seed material or fertilizer in granular form is known, which uses a cellular wheel and a stripping means associated thereto. The granulate discharged in a metered manner from the cellular wheel is transported pneumatically through guide chutes resp. individual channels into the discharge ducts with increased speed.

U.S. Pat. No. 3,606,965 discloses a device for exactly distributing metered amounts of a powdery material by means of rotating cylindrical drums which are subdivided into chambers, the open circular areas of which are cooperating with locking gates through which the amount of material is adjustable, which is distributed from supply bins into the chambers of the drums. The number of parallel drums is determined by the number of different materials to be distributed. Said different materials pass from the drums to a rotating plate, from where they are discharged to the soil.

PCT/WO 92/12619 refers to a metering device for sowing machines in order to discharge granulate seed material in an exactly metered manner. This device comprises cellular wheels, which are arranged parallel to each other on a common shaft, and which are arranged in a supply container and can be removed from the container as a unit together with the wheel. For dispensing the seed material, a pressurized airflow is passed over the cellular wheel, which transports and discharges the seed material to an outlet. By restricting the output channel, the speed of the pressurized air is increased.

SUMMARY OF THE INVENTION

It is the object of this invention with pneumatic sowing machines to meter granular seed material resp. with fertilizing distributors to meter granular fertilizer and the like in an individual and exact manner, and to obtain a modular metering device for multipurpose use.

In order to meet this object, the invention proposes a sowing apparatus for the metered dispensing of seed material of varying size and type, fertilizers, chemical granulates, etc. by means of at least one metering device, comprising a cellular wheel arranged within a casing, and a pneumatic drive for transporting the granular material discharged from the cellular wheel pneumatically through feeding ducts, hoses, etc. into distributor ducts, hoses, etc. to the fertilizer or granulate outlets, which is characterized in that a) the metering device is provided with one or several exchangeable cellular wheels, b) the casing of the metering device receiving the cellular wheel is arranged in an axial direction at both opposite face sides symmetrically in view of the fastening of the drive, the bearing, the assembling of the metering device, and the fastening thereof, and has a removable shaft, especially a shaft with polygon cross section, c) the casing is formed without bearings and at least one driving unit having a bearing and/or at least one bearing unit is coupled therewith, d) the shaft formed as a plug-on shaft is supported within the driving unit and/or bearing unit (units), and e) the driving and/or bearing unit (units) is (are) arranged so that it (they) can be stacked or screwed onto the casing.

With a modular metering system of this type, the metering of seeds such as grain, grass, rape, sunflowers, soja, maize, etc., and also granular fertilizer and other chemical granulate is possible in a universal and extremely accurate manner. The metering system is exclusively used for pneumatically operating sowing machines having one or several central seed tanks and seed distributors, which usually are arranged above individual sowing aggregates. Said metering devices meter seed for example into a duct or a hose through which pressurized air is passed and which transports the seed material to the distribution towers arranged above the sowing aggregates. Introducing the path-dependent metered seed material or fertilizer granulates either is performed by means of injectors in the form of nozzles, diffusers or the like, or according to the pressured tank or cellular wheel gate method.

The development of sowing machines tends to carry in addition to the seeding material at least one or several further components, f.e. granular fertilizers, chemical granulates an the like at the same time. Sowing machines of this type can be built with a width up to 18 m. Such superwide machines require a central tank system with pneumatic seed or fertilizer transport means and pneumatic seed or fertilizer distribution means as well central metering through a modular metering system. Furthermore, unique systems for a continuous drive, such as electric motors or hydraulic motors, enable the user to operate metering devices directly, and by means of computers also a partial area dependent correlation of dispensing advance-programmed different amounts of seed material, fertilizer and the like, as it can be used in connection with sophisticated satellite control (GPS or DGPS) for large agricultural fields.

For this type of future use of machines with extremely large operating widths seed containers extending over the full operating widths are no longer useful; rather, central seed containers or seed tanks are required, which are provided with modular metering systems according to the subject invention. For this way of use commercial metering systems with mechanical cardanic drive, gearing, etc. can no longer be used because they are too complex. Rather, infinitely variable drives are required, and furthermore, operating such metering devices and metering systems requires computer control. In addition, universal useability of the metering devices is most important. The modular system is formed in such a manner that the shaft of a metering device is supported on both ends only, that drive and bearings are independent units, which merely are to be slipped-on, and that the metering casing is absolutely symmetrically designed and can be driven from the left or from the right side. The used modular metering devices are axially symmetrical at both sides so far as it concerns the drive, the bearings and also the assembly of the metering device. Furthermore, fastening the corresponding metering device is symmetrical at the top and bottom. The driving units are designed so that they can be slipped onto (or plugged onto) the metering casing at both ends by quick-release means. This is also correct for the bearing unit at the side opposite to the driving unit. Driving unit and bearing unit each are provided with a seal, which is designed in such a manner that subsequent to slipping on of the driving unit and/or the bearing unit the casing is sealed airtight. A hollow shaft with polygonal cross-section is passed through the casing and the metering device. By means of a quick-release lock the shaft can be removed from the driving unit and bearing unit, and also can be re-inserted.

The modular metering systems according to the invention are constructed in such a manner that two or more metering devices with their metering casings can be arranged axially in such a manner that the facing sides of the metering devices are closed airtight, and that the in-line connected metering devices connected in-line by means of a correspondingly long shaft with polygon cross-section can be connected with each other without any intermediate support bearings, which means that the metering devices, which are arranged axially on the same shaft are supported exclusively at their ends. This type of supporting the shaft is obtained by forming and arranging the driving unit at one side and a bearing unit at the other side in such a manner that both units can be slipped or plugged onto the casing from the outside and can be locked in the attached position.

Furthermore, the modular metering devices in view of their entirely symmetrical arrangement are designed so that the driving unit at the one side and the bearing unit at the other side can be exchanged. In addition, it is possible to connect two metering devices, each of which is provided with a driving unit and a bearing unit, in such a manner that both adjacent bearing units with their faces are in contact with each other, whereas on the opposite sides driving units are attached.

The rotational direction of the drive preferably is electronically controlled so that the corresponding rotational direction is determined when the drive is slipped on. Reversing the rotational direction can be switched from outside. The metering devices or the metering casings preferably have quick-release means at their top or bottom side so that they can be removed from the sowing machine and be inserted again in a simple and fast manner, and an exchange can be effected within a very short time period.

According to a further embodiment of the invention, an exchangeable adapter member is provided between the seed tank and the measuring device, which adapter member feeds the seed flow or the granulate flow to any arrangement of metering devices. The adapter member is so that it can supply the seed flow to one metering device only (in longitudinal or transversal direction) or to several metering devices parallel to each other and/or several metering devices one behind the other, whereby said exchangeable adapter member is constructed so that it combines the hopper trunk downwardly in such a manner that a predetermined number of metering devices can be fed and the hopper can be emptied completely.

Dispensing the seed or granulate material from the metering devices can be controlled by providing input gates below the metering devices; by means of said gates the seed or granulate either is passed centrally into ducts or hoses arranged beyond the metering devices, or is passed to the metering devices laterally staggered in a longitudinal or transversal direction. Said input gates are structurally formed as guiding means or conveying means, for example ducts, pipes, tubes or hoses, which receive the metered granulate below the metering device throughout the whole cross-section.

Instead of using an electrical drive, the drive unit also can be operated mechanically by means of a gear transmission, toothed belt or the like and a gear wheel, whereby the driving gear wheel is attached to a shaft with polygonal cross-section which shaft in its operating condition extends from the casing.

BRIEF DESCRIPTION OF THE DRAWINGS

In the following, the subject invention will be described in connection with the drawings by embodiments. The figures show:

FIG. 1 is a schematic representation of a super-wide sowing machine;

FIG. 2 is a schematic representation, partly in cross-section, of a metering device according to the invention;

FIG. 3 is a metering device according to the invention with a driving unit and a bearing unit, each shown separate from the metering device;

FIG. 4 is a driving unit coupled with the shaft of the metering device;

FIG. 5 is a unit comprising three metering devices, which are directly coupled with each other;

FIGS. 12–15 show a special embodiment of a metering device according to the invention, whereby FIG. 12 is a front view;

FIG. 13 is a plan view;

FIG. 14 is a lateral view; and

FIG. 15 is a lateral cross-section view of the same device.

DETAILED DESCRIPTION OF THE PREFERRED EMBODIMENTS

Figure 6:
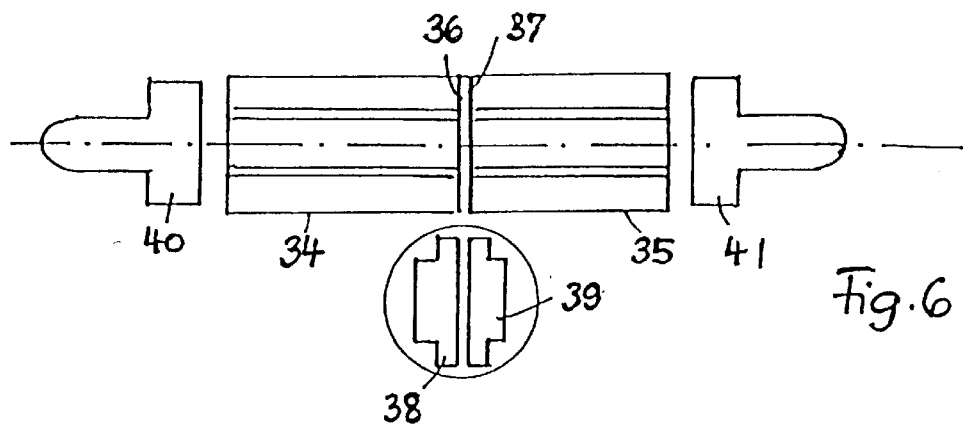
FIG. 6 is a pair of metering devices with both-sided drive.

The schematic view according to FIG. 1 shows a super-wide sowing machine, which comprises a seed tank 1, main seed lines 2 and 3 to distributors 4, 5 as well distributing ducts 6–13 starting from the distributors 4,5; from the distributing ducts 6–13 the seed material is discharged to the seed supply lines 14 and to the seeding blades and for laying the seed down to the soil. The main distributor ducts, hoses or pipes 2, 3 start from the metering system 15.

FIG. 2 shows the casing 16 of the metering device, the cellular wheel or cellular wheel system 17, the shaft 18 of the cellular wheel, the wiper 19 at the outer periphery of the cellular wheel, and the granular material, especially seed material 20 delivered from the cellular wheel and the wiper.

The explosion picture according to FIG. 3 shows the cellular wheel 17 within casing 16 with the throughgoing shaft 18 in cross-section. Associated to the front side 21 of the casing 16 is a driving unit 22, and associated to the opposite front side 23 of the casing 16 is a driving unit 22, and associated to the opposite front side 23 of the casing 16 is a bearing unit 24. Both units 22 and 24 comprise sealing means 25, 26 each, which when coupling the drive 22 or the bearing unit 24 with shaft 18 seal the interior of the casing 16 or the metering device in an airtight manner. The driving unit 22 is provided with a recess 27 with plug means 28 for receiving the shaft 18; the plug means are plugged or slipped onto shaft 18 and thus, are connected with the shaft. The bearing unit 24 comprises an axially outer closure plate 27a and an axially inner extension 28a receiving the actual bearings 29. Bearing unit 24 is also made as a plug-on member and is attached to shaft 18 so that the shaft is supported by the bearings 29 when it is attached and locked. The driving unit 22 connected with the shaft is shown in FIG. 4. Shaft 18 is a polygonal shaft, for example a hexagon shaft, which is locked when being plugged onto the slip-on means 28 of the driving unit.

FIG. 5 shows a metering system comprising three metering devices 30, 31, 32 which are connected with each other in-line without any gap, and which are attached to a common shaft 33 with polygonal cross-section. Shaft 33 and the individual metering devices 30–32 are supported exclusively at their ends through the plug-on connection with the drive 22 or at the other side with the plugged-on bearing unit 24, and there is no support at the points where the metering devices are connected with each other. Drive 22 is designed so that it is an infinitely variable driving unit, which is reversible, and which has neither a mechanical cardanic transmission nor a gear system so that a step-up gearing is integrated within the drive.

The embodiment according to FIG. 6 shows two metering devices 34, 35 coupled with each other in such a manner that their bearing-sided end surfaces 36, 37 join each other sealingly and the end-sided bearing units 38, 39 are fixedly connected with each other. The driving units 40, 41 are plugged onto the metering devices 34, 35 at their free ends. This arrangement can be multiplied in such a manner that any number of pairs of metering devices are arranged in line, that the metering devices are coupled with each other through their bearing units, and that driving units exclusively are provided at the outer end each, which means that merely two driving units altogether are provided.

Figures 7, 8:
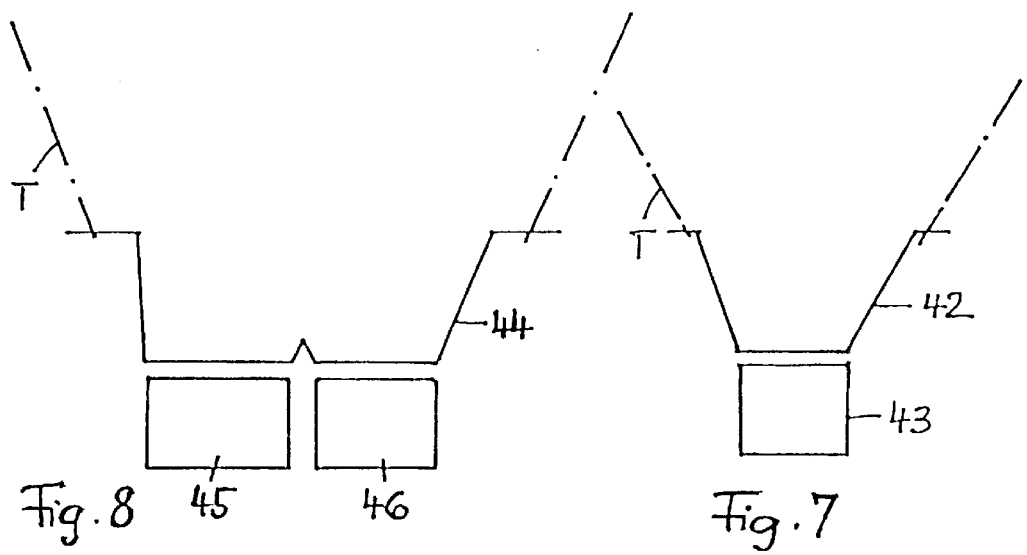
FIG. 7 is an adapter member for a metering device.
FIG. 8 is an adapter member for two metering devices.

FIG. 7 shows an adapter unit 42, which is arranged between the seed tank T and the metering device 43 and controls the feeding of the flow of seed material from the seed tank to the metering device. The adapter unit 42 is exchangeable and can be substituted by another adapter unit 44 according to FIG. 8, which is associated to two metering devices 45, 46. Basically, the adapter unit is a distributor between the bottom of the tank and the metering device in order to be able to feed the flow of seed material to one metering device in the longitudinal or transversal direction, to several metering devices arranged parallel to each other, to several metering devices arranged in line, or to several metering devices, which are arranged in parallel and in line, in order to be able to adapt the control of the flow of seed material to the required conditions in an optimum manner, whereby it is merely necessary to exchange the adapter unit 42 and 44.

Figure 9:
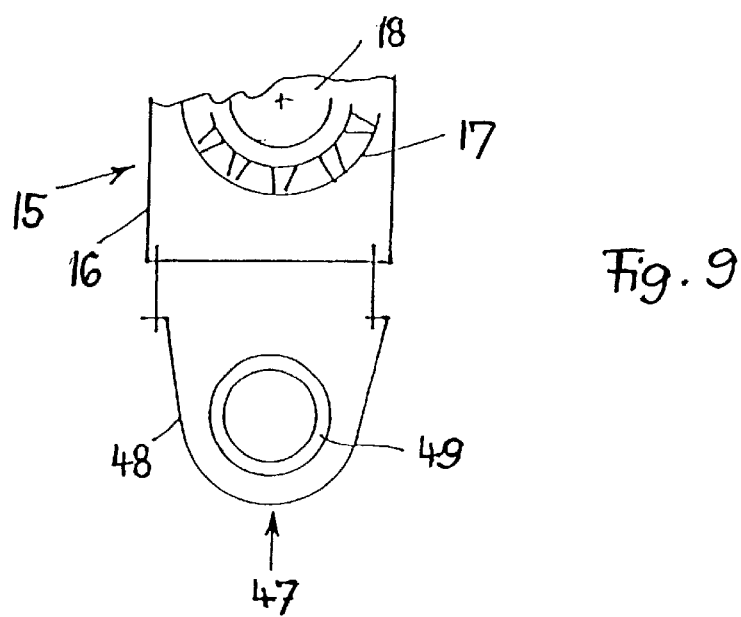
FIG. 9 is an input gate for a metering device.

The feed-in gate 47 according to FIG. 9 provided below the metering device 15, comprises a casing 48, which is widened at the top and narrowed at the bottom, and which receives the flow of granular material 20 from the metering device. The granular material 20 passes various gates 49, which are adjustable in their association below the metering device so that the seed material alternatively can be arranged centrally below the metering device within the ducts or hoses provided for this purpose, or are arranged laterally lengthwise or transverse to the metering devices.

Figure 10:
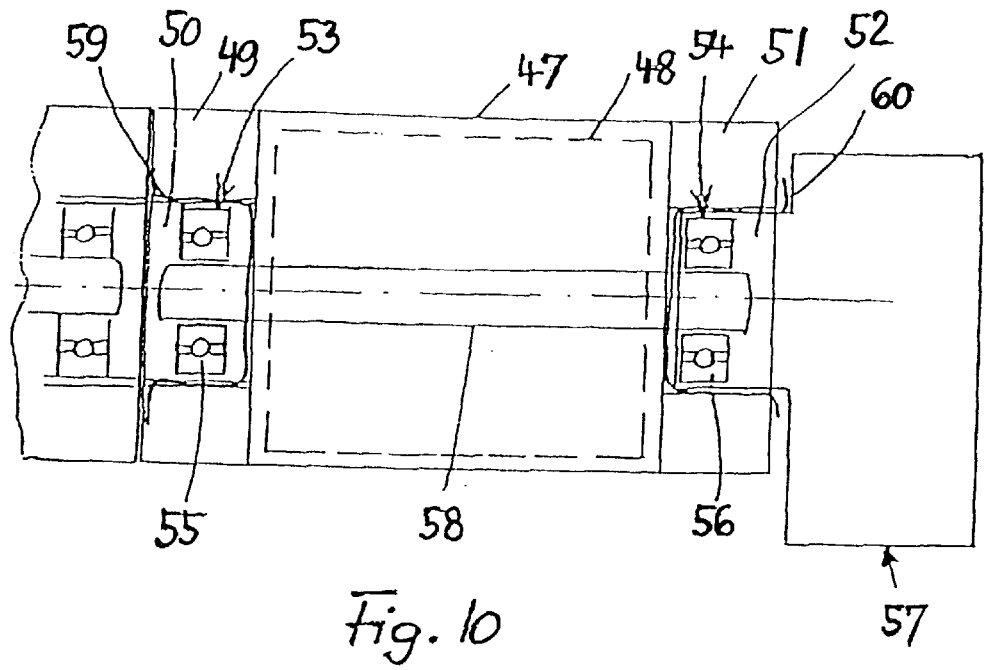
FIG. 10 is an embodiment of a metering device with inserted driving unit and bearing unit.

The embodiment according to FIG. 10 shows a metering device 47, a cellular wheel 48, and two side walls 49, 50 and 51, 52 of the casing. 50 and 52 are the recesses of the lateral walls 49 and 51 of the casing, which recesses receive the bearing units 53 and 54, 55 and 56 are the bearing elements. Driving unit 57 is made integral with the bearing site 54. Bearings 55 and 56 receive shaft 58, preferably a shaft with polygonal cross-section which in its assembled position is connected with casing 47 by plugging and locking. Seals 59 and 60 which in their assembled position are activated, form an airtight seal of the inner space of the metering device in view of the environment.

Figure 11:
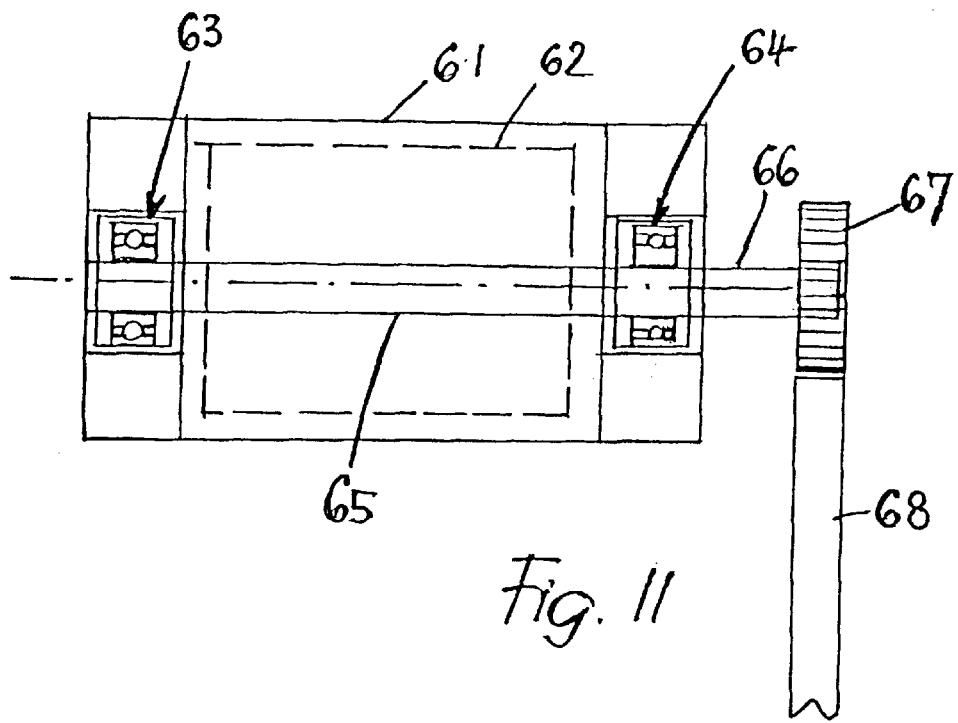
FIG. 11 is a further embodiment of a mechanical drive of a metering device.
Figure 15:
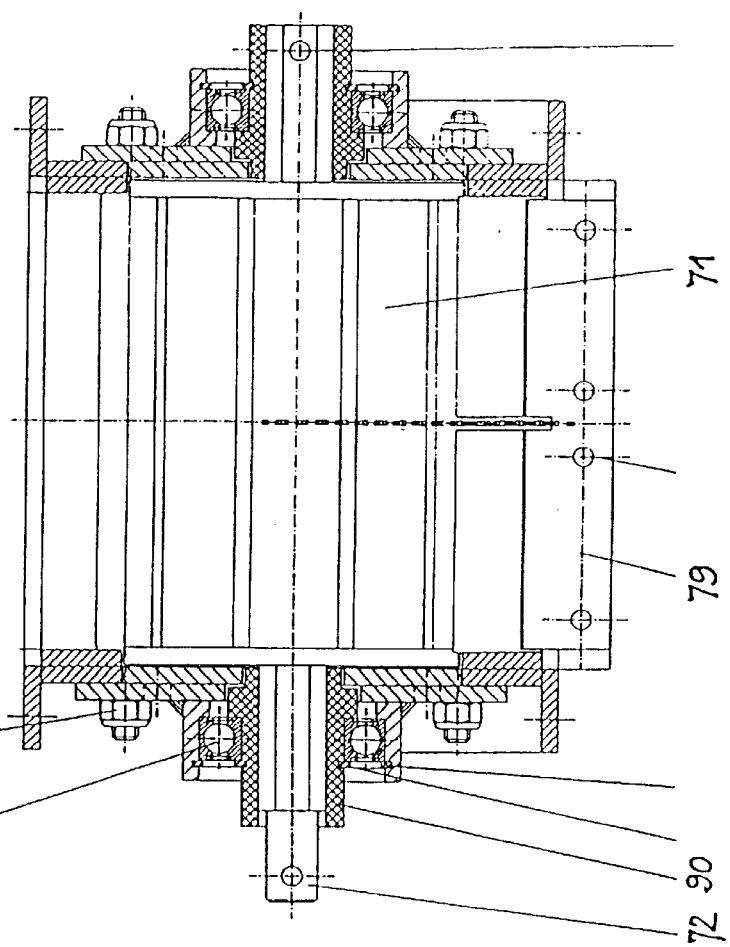
Figure 13:
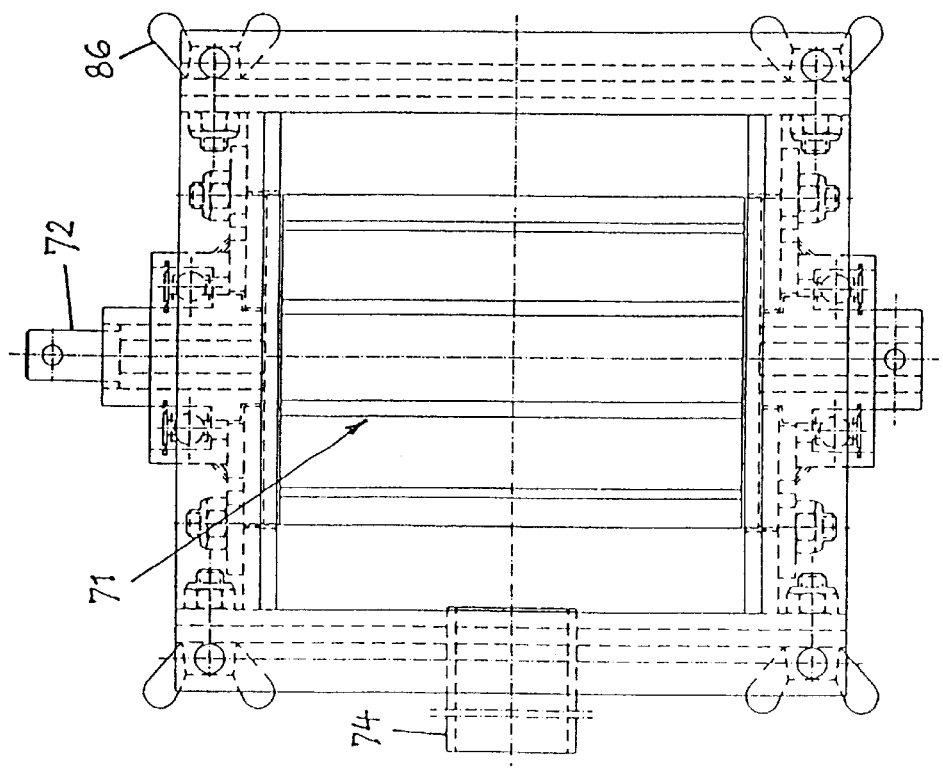

FIG. 11 shows an embodiment of a metering device 61 with mechanical drive. Metering device 61 receives the cellular wheel 62 in bearings 63, 64 and shaft 65 supported in said bearings, with the butt 66 of shaft 65 fastened at one end to a gear wheel 67, which is driven through a gear system or a toothed belt 68.

Analog to the schematic drawing of FIG. 2, FIGS. 12–15 show the metering casing 70 with cellular wheel 71, cellular wheel shaft 72 and granulate feeding duct 73. The connection between the device and the seed tank, from which the granular material is delivered to the device by means of pneumatic pressurization, is shown at 74. The cells 75 of the cellular wheel 71 receive the grains through the granulate inlet 73, and a sliding lip 77 removes granular material from the periphery of the cellular wheel. The granular material received within the cells is transported in the rotational direction of arrow 78, and at the discharge position is engaged by the wiper lip 79, which by means of backing supports 80 wipes off granular material at the apertures of the cells and delivers the granular material in metered quantities through an aperture 81 within bottom 82 of the casing downwardly. 83 is a guide plate for the granular material. 84 and 85 are covering plates at the metering casing 70, which fastened by wing bolts 86 close apertures within the metering casing, through which the interior space is accessible. 87 is a flange plate fastened to the wall of the casing and receiving a bearing unit 88 for the cellular wheel. Said flange plate can be fastened on one side at the casing, however, it can also be arranged two-sided. 89 are tightening screws, which tighten the cellular wheel in an axial direction. The bearing unit 88 is arranged on a sleeve 90.

What is claimed is:

1. A sowing apparatus for metered dispersing of granular material of varying size and type received from a seeder tank, utilizing at least one metering device provided with at least one cellular wheel arranged within a casing, and a pneumatic device for transporting the granular material discharged from the cellular wheel pneumatically through feeding conduits into distributor conduits to granular material outlets, comprising:

a driving unit having bearings therein, said driving unit attached to one side of the casing;

a bearing unit having bearings therein, said bearing unit attached to the opposite side of the casing from said driving unit;

a removable shaft having a length substantially the same as the width of the casing, the cellular wheel provided with symmetrical opposite faces, said removable shaft provided within the cellular wheel, the cellular wheel provided within a bearingless casing, said removable shaft supported by said bearings of said driving unit and said bearings of said bearing unit, and further wherein;

said driving unit and said bearing unit are provided with a sealing means facing the casing providing an air-tight seal between said driving unit and the casing as well as said bearing unit and the casing.

2. The sowing apparatus in accordance with claim 1, wherein said driving unit and said bearing unit are plugged into the casing.

3. The sowing apparatus in accordance with claim 1 utilizing at least two metering devices arranged axially together provided on said removable shaft, each metered device provided with a cellular wheel provided with a bearingless casing, wherein said removable shaft has a polygon shape, and further wherein said driving unit is provided on one side of the casings of at least two metering devices and said bearing unit is provided on the opposite side of said casings of the two metering devices, said driving unit, the metering devices and said bearing unit provided on a single shaft and creating an air-tight seal.

4. A sowing apparatus according to claim 1 wherein two or a plurality of metering devices are provided with bearing units inserted in and closely joining each other at their faces, and that at both outer faces one driving unit each is connected with the associated metering devices.

5. A sowing apparatus according to claim 1, wherein between the seeder tank and the metering devices one or several exchangeable adapter elements, which are arranged parallel in pairs and which deliver the flow of seeds onto one or several metering devices are provided in a selectable relationship with the metering devices.

\* \* \* \* \*